United States Patent
Horng et al.

(10) Patent No.: US 7,245,098 B1
(45) Date of Patent: Jul. 17, 2007

(54) BRUSHLESS DC MOTOR HAVING A MOTOR-LOCKED PROTECTIVE CIRCUIT

(75) Inventors: Alex Horng, Kaohsiung (TW); Chung-Ken Cheng, Kaohsiung (TW)

(73) Assignee: Sononwealth Electric Machine Industry Co., Ltd., Kaohsiung (TW)

( * ) Notice: Subject to any disclaimer, the term of this patent is extended or adjusted under 35 U.S.C. 154(b) by 0 days.

(21) Appl. No.: 11/385,878

(22) Filed: Mar. 22, 2006

(51) Int. Cl.
*H02P 6/08* (2006.01)

(52) U.S. Cl. ........................ 318/434; 318/254

(58) Field of Classification Search ............... 318/138, 318/254, 430–434, 720–724
See application file for complete search history.

(56) References Cited

U.S. PATENT DOCUMENTS

| | | | |
|---|---|---|---|
| 4,544,868 A * | 10/1985 | Murty | 318/254 |
| 5,963,706 A * | 10/1999 | Baik | 388/804 |
| 6,392,418 B1 * | 5/2002 | Mir et al. | 324/503 |
| 7,042,180 B2 * | 5/2006 | Terry et al. | 318/434 |
| 2001/0015633 A1 | 8/2001 | Nishimura et al. | |
| 2002/0024313 A1 | 2/2002 | Cho et al. | |
| 2002/0074969 A1 | 6/2002 | Edelson | |
| 2002/0158600 A1 | 10/2002 | Seima et al. | |

* cited by examiner

*Primary Examiner*—Bentsu Ro
(74) *Attorney, Agent, or Firm*—Birch, Stewart, Kolasch & Birch, LLP

(57) ABSTRACT

A brushless dc motor includes a PWM drive IC member, a Hall IC member, a PWM converter circuit and a Rotational Detection (RD) signal line. The PWM drive IC member electrically connects with the Hall IC member, the PWM drive IC member further includes a pin electrically connected with the PWM converter circuit. The RD signal line connects between the pin of the PWM drive IC member and the PWM converter circuit, and further connects with a RD signal source to supply RD signals to the pin of the PWM drive IC member. When the motor is jammed, the jammed RD signals can build a predetermined voltage which can determine the PWM drive IC member to be restarted or operated at a predetermined-speed mode. In this circumstance, no inrush current of the jammed motor will occur.

18 Claims, 4 Drawing Sheets

BRUSHLESS DC MOTOR HAVING A MOTOR-LOCKED PROTECTIVE CIRCUIT

BACKGROUND OF THE INVENTION

1. Field of the Invention

The present invention relates to a brushless dc motor having a motor-locked protective circuit. Particularly, the present invention relates to a PWM motor having a motor-locked protective circuit. More particularly, the present invention relates to the PWM motor having a RD (Rotational Detection) signal line to connect between a PWM drive IC member and a PWM converter circuit so that RD signals can maintain the PWM motor to be operated at a predetermined-speed mode when the motor is jammed.

2. Description of the Related Art

Referring to FIG. 1, a conventional brushless dc motor includes a motor drive circuit 1 electrically connected with a motor coil 2 so as to carry out alternatively magnetizing (energizing) the motor coil 2. The alternatively magnetized motor coil 2 can drive a motor rotor (not shown) to turn with respect to a motor stator (not shown) of the motor. Typically, the motor drive circuit 1 includes a PWM drive IC member 10, a Hall IC member 11 and a PWM converter circuit 12. The PWM drive IC member 10 electrically connects with the Hall IC member 11 so as to permit the PWM drive IC member 10 to receive rotor-detecting signals (i.e. rotational detecting signals) generated from the Hall IC member 11. However, the PWM drive IC member 10 is designed to have a pin $V_{TH}$ which electrically connects with the PWM converter circuit 12. Correspondingly, the PWM converter circuit 12 has a PWM input pin 121 serving to introduce a PWM signal from an exterior system (not shown). The PWM signal is converted into a voltage signal by the PWM converter circuit 12, and then sent it to the pin $V_{TH}$ of the drive IC member 10 for controlling or adjusting a period of alternative magnetization of the motor coil 2. Accordingly, operational statuses of the motor are possessed of multi-speed modes in heat-dissipating operation by means of the PWM signal.

Generally, the motor divides the operational statuses into a high-speed mode (including full speed), a low-speed mode (excluding full or zero speed) and a stopping mode (zero speed). The PWM drive IC member 10 can determine the operational statuses of the motor according to the input PWM signal such that the motor can be adjusted and changed in speeds to fulfill various system needs. For example, when a voltage of the pin $V_{TH}$ of the PWM drive IC member 10 is higher than 3.6 volts, the PWM drive IC member 10 controls the motor to operate at the stopping mode as well as zero rpm. Conversely, when the voltage of the pin $V_{TH}$ of the PWM drive IC member 10 is lower than 2.0 volts, the PWM drive IC member 10 controls the motor to operate at the high-speed mode as well as 6,000 rpm. If the voltage of the pin $V_{TH}$ of the PWM drive IC member 10 is in the range of 2.0 volts to 3.6 volts, the PWM drive IC member 10 controls the motor to operate at the low-speed mode as well as greater than zero rpm but lesser than 6,000 rpm.

Referring again to FIG. 1, the motor drive circuit 1 is designed to have a capacitor 3 parallel-connected between the PWM drive IC member 10 and the PWM converter circuit 12. Meanwhile, the capacitor 3 is designed to have a ground connection in place. In operation, the capacitor 3 is adapted to commutate a saw tooth wave input from the PWM converter circuit 12. However, the capacitor 3 of the motor drive circuit 1 is so configured to stabilize the voltage of the pin $V_{TH}$ of the PWM drive IC member 10. When the motor is actuated, the voltage of the pin $V_{TH}$ of the PWM drive IC member 10 can determine and adjust the speed of the motor.

Referring to FIGS. 2A and 2B, the PWM drive IC member 10 can control the motor to operate in the high-speed mode or the low-speed mode. In normal operation, the speed of the motor is operating at 2,000 rpm as well as low-speed mode when the voltage of the pin $V_{TH}$ of the PWM drive IC member 10 is maintained at 3.0 volts (i.e. lesser than 3.6 volts but greater than 2.0 volts). But, in abnormal (high temperature) operation, the speed of the motor is operating at high-speed mode when the voltage of the pin $V_{TH}$ of the PWM drive IC member 10 is dropped to zero volts (i.e. lesser than 2.0 volts).

Still referring to FIGS. 2A and 2B, due to a ground connection, the voltage across the capacitor 3 is generally zero volts, as best shown in FIG. 2A, and the capacitor 3 can be charged by a voltage from a power supply when the motor is started. Inevitably, the voltage of the pin $V_{TH}$ of the PWM drive IC member 10 is maintained at substantially zero volts. In this way, the PWM drive IC member 10 can invariably control the motor to operate in the high-speed mode as long as the motor is started; namely, the speed of the motor is rapidly and shortly jumped to 6,000 rpm (i.e. full speed) from zero rpm, as best shown in FIG. 2B.

Referring back to FIGS. 1 and 2B, once started, the motor must inevitably enter the high-speed mode that must rapidly and shortly increase the speed of the motor. However, there is no greater amount of operational heat for dissipation. This results in the motor unnecessarily operating at full speed (i.e. top speed) that generates an increased amount of air noise and vibration. Furthermore, the motor occurs an increased amount of abrasion among motor components that may shorten the longevity of the motor.

Referring again to FIGS. 2A and 2B, the voltage across the capacitor 3 can reach 3.0 volts in the event after charging for a predetermined time. In this way, the voltage of the pin $V_{TH}$ of the PWM drive IC member 10 is greater than 2.0 volts but lesser than 3.6 volts so that the PWM drive IC member 10 terminates the motor to operate in the high-speed mode. Accordingly, the speed of the motor is dropped to a predetermined speed or a lower speed of 2,000 rpm.

However, ambient heat generated from a heat source is lower than a high temperature when the motor is started. Therefore, it is undesirable to permit the PWM drive IC member 10 to increase the speed of the motor reaching 6,000 rpm in the high-speed mode that is unsuitable for the need of normal usage or an improper usage of the motor due to a waste of power consumption. Hence, there is a need for improving the motor to prevent entering the high-speed mode while starting.

In order to solve the motor to be unexpectedly operated at the high-speed mode while starting, an approach to this problem is disclosed in applicant's own U.S. patent application Ser. No. 11/247,417, the entire disclosure of which is incorporated herein by reference. In this approach, a capacitor is parallel connected between a pin $V_{TH}$ of the PWM drive IC member and PWM converter circuit, and the capacitor has an end further connecting with a power source. Accordingly, the voltage of the pin $V_{TH}$ of the PWM drive IC member 10 cannot drop to zero voltage in such a way as to prevent the motor from unexpectedly entering a high-speed mode while starting the motor.

In addition, with reference to FIG. 1, when the motor is normally rotated, the PWM drive IC member 10 can be situated at a normally operational temperature. For instance, if the motor is applied by a rated current of 0.543 amperes, the operational temperature of the PWM drive IC member 10 produces about 36 degrees centigrade that may not damage the PWM drive IC member 10 and other motor electronic components, as is demonstrated in observed experimental results in the study. Conversely, when the motor is jammed (locked) or failed, the PWM drive IC member 10 is successively supplied by the rated current which is suitable for the high-speed mode such that the operational temperature generated from the PWM drive IC member 10 rapidly raises. Even the rated current of the motor may synchronously increase. On the other hand, the normally rated current of the motor is still applied by 0.543 amperes. For instance, if the motor is jammed (locked) or failed, the operational temperature generated from the PWM drive IC member 10 can be rapidly jumped up to 73.1 degrees centigrade. Even the rated current of the motor is increasing about 1.086 amperes, as is demonstrated in observed experimental results in the study. Inevitably, such a high temperature may damage the PWM drive IC member 10 and other motor electronic components.

As is described in greater detail below, the present invention intends to provide a brushless dc motor having a motor-locked protective circuit, wherein a RD (Rotational Detection) signal line connects between a PWM drive IC member and a PWM converter circuit so that RD signals can build a predetermined voltage to control the PWM drive IC. The predetermined voltage can maintain the brushless dc motor to be operated at a predetermined-speed mode when the motor is jammed. In this manner, an operational temperature of the PWM drive IC member cannot be rapidly increased in such a way as to mitigate and overcome the above problem.

SUMMARY OF THE INVENTION

The primary objective of this invention is to provide a brushless dc motor having a motor-locked protective circuit, wherein a RD signal line connects between a PWM drive IC member and a PWM converter circuit so that jammed RD signals can build a predetermined voltage to control the PWM drive IC. The predetermined voltage can maintain the brushless dc motor to be operated at a predetermined-speed mode when the motor is jammed. Accordingly, the protective circuit is so configured to protect the jammed motor from being rapidly increasing an operational temperature.

The secondary objective of this invention is to provide the brushless dc motor having the motor-locked protective circuit having the protective circuit, wherein a RD signal line connects between a PWM drive IC member and a PWM converter circuit so that jammed RD signals can limit the PWM drive IC to be operated at predetermined-speed mode and avoid an inrush current resulting from a high-speed-mode of the jammed motor. Accordingly, the protective circuit is so configured to avoid an inrush current of the jammed motor.

The brushless dc motor in accordance with an aspect of the present invention includes a PWM drive IC member, a Hall IC member, a PWM converter circuit and a RD signal line. The PWM drive IC member electrically connects with the Hall IC member, the PWM drive IC member further includes a pin electrically connected with the PWM converter circuit. The RD signal line connects between the pin of the PWM drive IC member and the PWM converter circuit, and further connects with a RD signal source to supply RD signals to the pin of the PWM drive IC member. When the motor is jammed, the jammed RD signals can build a predetermined voltage which can determine the PWM drive IC member to be restarted or operated at a predetermined-speed mode. In this circumstance, no inrush current of the jammed motor will occur.

In a separate aspect of the present invention, the PWM drive IC member further includes a RD signal pin to constitute the RD signal source where the RD signal line connects.

In a further separate aspect of the present invention, the RD signal line includes a Zener diode serially connected thereon.

In a yet further separate aspect of the present invention, the brushless dc motor further includes a capacitor connecting between the pin of the PWM drive IC member and the PWM converter circuit, and further connects with a power source to supply a voltage to the pin of the PWM drive IC member. When the motor is started or restarted, the capacitor can prevent occurring zero volts at the pin of the drive IC member so that the drive IC member cannot unexpectedly enter a high-speed mode.

In a yet further separate aspect of the present invention, the capacitor can be constructed from a plurality of capacitor units which are connected in parallel each other.

In a yet further separate aspect of the present invention, the capacitor can be constructed from a plurality of capacitor units which are connected in series each other.

In a yet further separate aspect of the present invention, a capacitance of the capacitor can be adjusted according to the design choice so that a buffer period for the PWM drive IC member can be adjusted.

In a yet further separate aspect of the present invention, the PWM drive IC member has a first pin and a second pin; the capacitor connects between the first pin and the second pin of the PWM drive IC member.

Further scope of the applicability of the present invention will become apparent from the detailed description given hereinafter. However, it should be understood that the detailed description and specific examples, while indicating preferred embodiments of the invention, are given by way of illustration only, since various will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
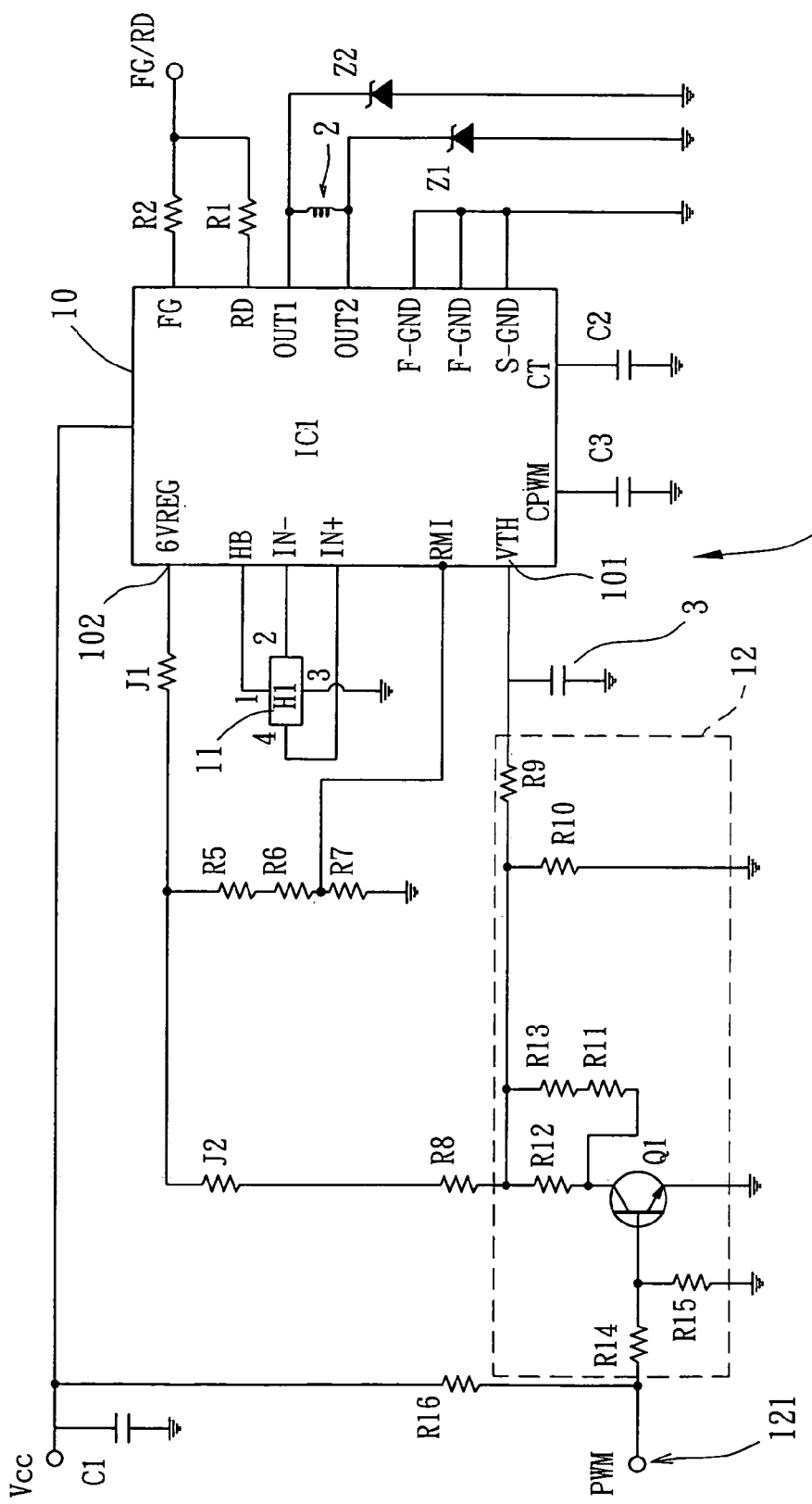
FIG. 1 is a schematic circuitry diagram of a conventional brushless dc motor drive circuit in accordance with the prior art.
Figure 2A:
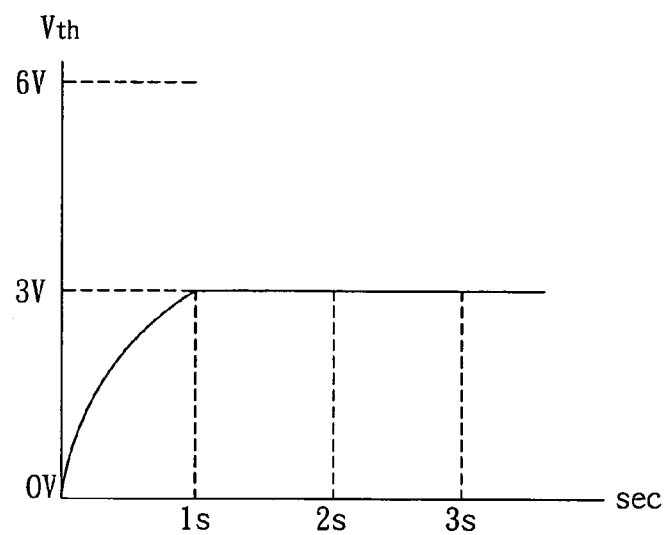
FIG. 2A is a timing diagram relating to the voltage at a selected pin of a PWM drive IC member of the conventional brushless dc motor drive circuit in FIG. 1 in accordance with the prior art.
Figure 2B:
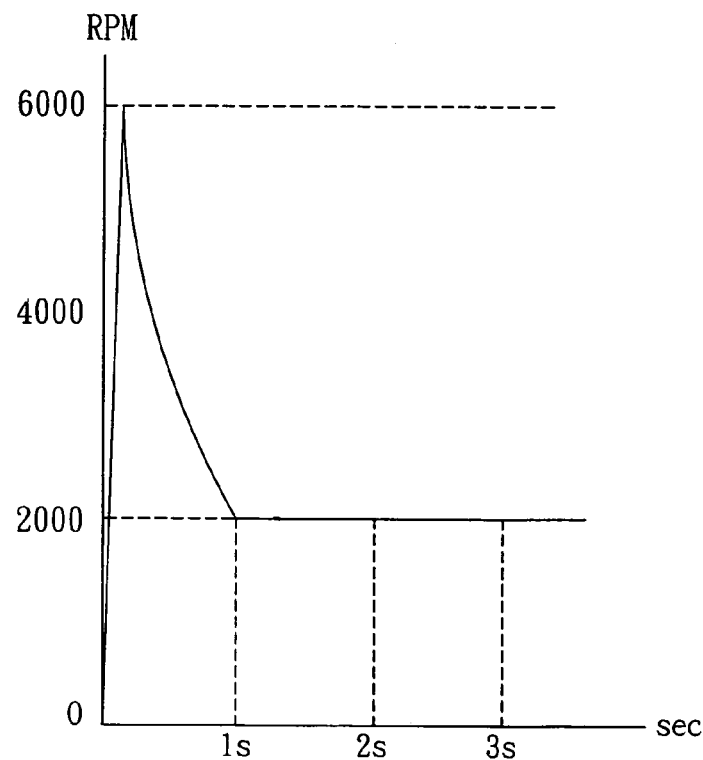
FIG. 2B is a timing diagram relating to speeds of the conventional brushless dc motor controlled by the PWM drive IC member in accordance with the prior art.
Figure 3:
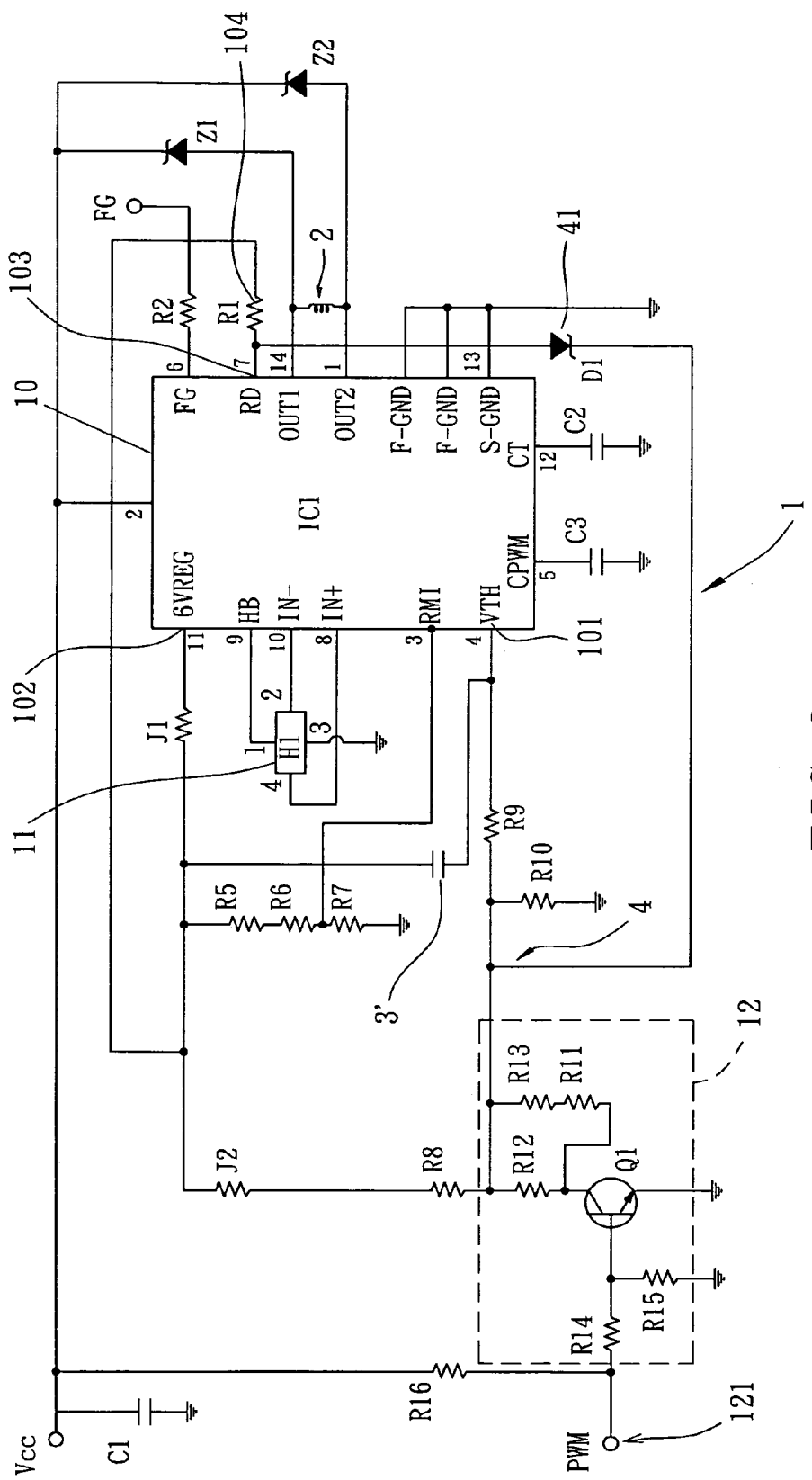
FIG. 3 is a schematic circuitry diagram of a brushless dc motor having a motor-locked protective circuit in accordance with a first embodiment of the present invention.

Turning now to FIG. 3, a schematic circuitry diagram illustrating a motor drive circuit of a brushless dc motor in accordance with a first embodiment of the present invention is provided. It should be understood that reference numerals of the brushless dc motor of the first embodiment of the present invention have applied the identical numerals of the conventional brushless dc motor, as shown in FIG. 1.

Still referring to FIG. 3, the motor drive circuit 1 has a motor-locked protective circuit which can protect the motor drive circuit 1 when locked or jammed. The motor drive circuit 1 electrically connects with a motor coil 2 so as to carry out alternatively magnetizing the motor coil 2. In a preferred embodiment, the motor coil 2 can be selected from a group consisting of a single-phase coil, a double-phase coil and a three-phase coil. Typically, the motor drive circuit 1 includes a PWM drive IC member 10, a Hall IC member 11, a PWM converter circuit 12, at least one capacitor 3' and a RD signal line 4. In the first embodiment, the RD signal line 4 is disposed in the motor drive circuit 1 to constitute the motor locked protective circuit of the motor drive circuit 1. In operation, the PWM motor drive circuit 1 is adapted to control the motor coil 2 so that the motor coil 2 can generate an alternatively magnetic field.

Still referring to FIG. 3, the PWM drive IC member 10 electrically connects with the Hall IC member 11, and further electrically connects with the PWM converter circuit 12. The PWM drive IC member 10 includes a first pin (identified as "$V_{TH}$") 101, a second pin (identified as "6VREG") 102 and a third pin (identified as "RD") 103. The first pin $V_{TH}$ 101 is adapted to electrically connect with the PWM converter circuit 12 for introducing PWM signals while the second pin 102 is adapted to supply a predetermined voltage to the PWM converter circuit 12 and the capacitor 3'. Furthermore, the third pin 103 can output a RD signal to determine whether to built a predetermined voltage on the RD signal line 4. In a preferred embodiment, the second pin 102 of the drive IC member 10 supplies 6.0 volts to the PWM converter circuit 12, the capacitor 3' and the RD signal line 4.

Still referring to FIG. 3, in a preferred embodiment, the third pin 103 of the PWM drive IC member 10 electrically connects with the second pin 102 via a resister (identified as "$R_1$"). In this preferred embodiment, the RD signal line 4 further includes a Zener diode 41 to electrically connect with a point between the PWM converter circuit 12 and the first pin 101 of the PWM drive IC member 10. In this manner, the third pin 103 of the PWM drive IC member 10 can maintain a low voltage across the RD signal line 4 when the motor is normally operated. This result in the RD signal line 4 to provide a normal RD signal that may not build a voltage on the first pin 101 of the PWM drive IC member 10. Conversely, the third pin 103 of the PWM drive IC member 10 can be changed to build a high voltage across the RD signal line 4 when the motor is locked or jammed. This result in the RD signal line 4 to provide a jammed RD signal that may build a predetermined voltage on the first pin 101 of the PWM drive IC member 10 so as to determine the PWM drive IC member 10 to be restarted or operated at a predetermined-speed mode.

Still referring to FIG. 3, when the motor is started, the first pin 101 of the PWM drive IC member 10 connects with the second pin 102 via the capacitor 3' so to as to build a predetermined voltage at the first pin 101 of the PWM drive IC member 10, 6.0 volts for example. The PWM drive IC member 10 can control the speed of the motor according to the need. In normal operation, when the voltage of the first pin 101 of the PWM drive IC member 10 is maintained at 3.0 volts (i.e. less than 3.6 volts but greater than 2.0 volts), the speed of the motor can be operated at 2,000 rpm as well as in a low-speed mode. But, conversely, if the voltage of the first pin 101 of the PWM drive IC member 10 is dropped to zero volts (i.e. less than 2.0 volts), the speed of the motor can be accelerated to operate in a high-speed mode by discharging a predetermined extent of the capacitor 3'. It will be understood that the motor drive circuit 1 permits discharging the capacity 3' if there is a need of increasing the speed of the motor.

Once the motor is started or restarted, the first pin 101 of the PWM drive IC member 10 can be constantly built the predetermined voltage (6.0 volts for example); subsequently, the voltage of the first pin 101 of the PWM drive IC member 10 can be gradually dropped to 3.0 volts. Correspondingly, the speed of the motor can be gradually increased from zero to 2,000 rpm or a predetermined speed. Consequently, the PWM drive IC member 10 can control the motor to have a buffer period for increasing speed so as to smoothly speed the motor to the predetermined speed and to maintain the speed of the motor in the low-speed mode while starting.

Referring again to FIG. 3, the Hall IC member 11 is adapted to detect a signal of a motor rotor and to send it to the PWM drive IC member 10. Accordingly, the PWM drive IC member 10 can determine switching on or off the motor coil 2 such that the alternatively magnetic field of the motor coil 2 can drive the motor rotor to turn. It will be understood that the PWM drive IC member 10 can observe the rotational status of the motor by receiving Hall signals generated from the Hall IC member 11. At the same time, the third pin 103 of the PWM drive IC member 10 can synchronously provide RD signals to the RD signal line 4 for building a predetermined voltage on the first pin 101 of the PWM drive IC member 10.

On the other hand, the PWM converter circuit 12 has a PWM input terminal 121 connected with a PWM source so as to receive PWM signals by referring particularly to the left side of FIG. 3. In operation, the PWM converter circuit 12 is adapted to convert the PWM signals into voltage signals and to send them to the first pin 101 of the PWM drive IC member 10 such that the PWM drive IC member 10 can determine a cycle for switching the alternatively magnetic field of the motor coil 2. Consequently, the speed of the PWM motor is controlled. In the first embodiment, it will be understood that the voltage built by either of the capacitor 3' or the RD signal line 4 may not interfere in the voltage signals which is converted from the PWM signals by the PWM converter circuit 12.

The capacitor 3' connects in parallel between the first pin 101 of the PWM drive IC member 10 and the PWM converter circuit 12 by referring particularly to the middle portion of FIG. 3. In an alternative embodiment, the capacitor 3' can be constructed from a plurality of capacitor units which are connected in parallel or series each other. Meanwhile, the capacitor 3' connects between the first pin 101 and the second pin 102 of the PWM drive IC member 10. In an alternative embodiment, the capacitor 3' can connect with a power source or other equivalent voltage sources. When the motor is stopped, the voltage of the capacitor 3' can be maintained at 3.0 volts due to the voltage of the second pin 102 of the PWM drive IC member 10.

Once the motor is started, the voltage of the first pin 101 of the PWM drive IC member 10 can be gradually dropped from the predetermined voltage (6.0 volts for example) to 3.0 volts. Correspondingly, the speed of the motor can be started from zero rpm (i.e. stopped status); speeded up within the buffer period determined by the motor drive circuit 1; and maintained at 2,000 rpm or a predetermined speed in the event.

Referring again to FIG. 3, the capacitance of the capacitor 3' can be adjusted according to the design choice so that the buffer period for the motor drive circuit 1 can be adjusted. Advantageously, the speed of the motor must be paced within the buffer period determined by the motor drive circuit 1 to reach a predetermined speed. Consequently, improper speeding of the PWM motor can be eliminated while starting.

When the motor is normally run, the third pin 103 of the PWM drive IC member 10 can output a logical low-voltage signal of the RD signal across the RD signal line 4. At the same time, the third pin 103 permits the current from the second pin 102 to pass through the resistor 104 and then to inject into the third pin 103. This results in a low voltage on the third pin 103 due to the current passing through the resistor 104. In this circumstance, this current from the second pin 102 of the PWM drive IC member 10 cannot run into the first pin 101 of the PWM drive IC member 10 due to a voltage limitation of the Zener diode 41. In other words, the RD signal line 4 does not build any voltage between the first pin 101 of the PWM drive IC member 10 and the PWM converter circuit 12 so that it may not affect the normal operation of the motor.

Conversely, if the motor is locked or jammed, the third pin 103 of the PWM drive IC member 10 can output a logical high-voltage signal of the RD signal across the RD signal line 4, and automatically limits the current from the second pin 102 to inject into the third pin 103. In this circumstance, this current from the second pin 102 of the PWM drive IC member 10 can flow through the Zener diode 41 to the first pin 101 of the PWM drive IC member 10 due to a high voltage built on the third pin 103. It will be understood that the high voltage built on the third pin 103 is greater than a breakdown voltage of the Zener diode 41. At the first pin 101, the RD signal line 4 can immediately build a predetermined voltage via the Zener diode 41. Consequently, the PWM drive IC member 10 can be operated in the low-speed mode when the motor is locked or jammed.

Still referring to FIG. 3, when the motor is restarted, the voltage of the capacitor 3' (i.e. the voltage of the first pin 101 of the PWM drive IC member 10) can be gradually dropped from 6.0 volts to 3.0 volts. The motor speed may be increased from zero rpm (i.e. stopped status) in the buffer period, and may be maintained at 2,000 or a predetermined speed in the event. Once the jammed conditions of the motor are eliminated, the third pin 103 of the PWM drive IC member 10 can output the logical low-voltage signal of the RD signal across the RD signal line 4, and has replaced the logical high-voltage signal occurring in the jammed motor. Consequently, the PWM drive IC member 10 can be normally operated, and the motor speed can be returned to a correct speed according the system need.

When the motor is normally rotated, the PWM drive IC member 10 can be situated at a normally operational temperature by referring again to FIG. 3. For instance, if the motor is applied by a rated current of 0.543 amperes, the operational temperature of the PWM drive IC member 10 produces about 36 degrees centigrade that may not damage the PWM drive IC member 10 and other motor electronic components, as is demonstrated in observed experimental results in the study. Conversely, when the motor is jammed (locked) or failed, the PWM drive IC member 10 can automatically change to a low-speed mode so that a small current is supplied to the PWM drive IC member 10 and may result in slight changes in operational temperatures of the PWM drive IC member 10. For instance, once the motor is jammed (locked) or failed, the rated current of the PWM drive IC member 10 is automatically dropped from 0.543 amperes to 0.069 amperes. This only results in a small increase of the operational temperature generated from the PWM drive IC member 10 to 39.2 degrees centigrade, as is demonstrated in observed experimental results in the study. However, such a temperature may not damage the PWM drive IC member 10 and other motor electronic components.

Figure 4:
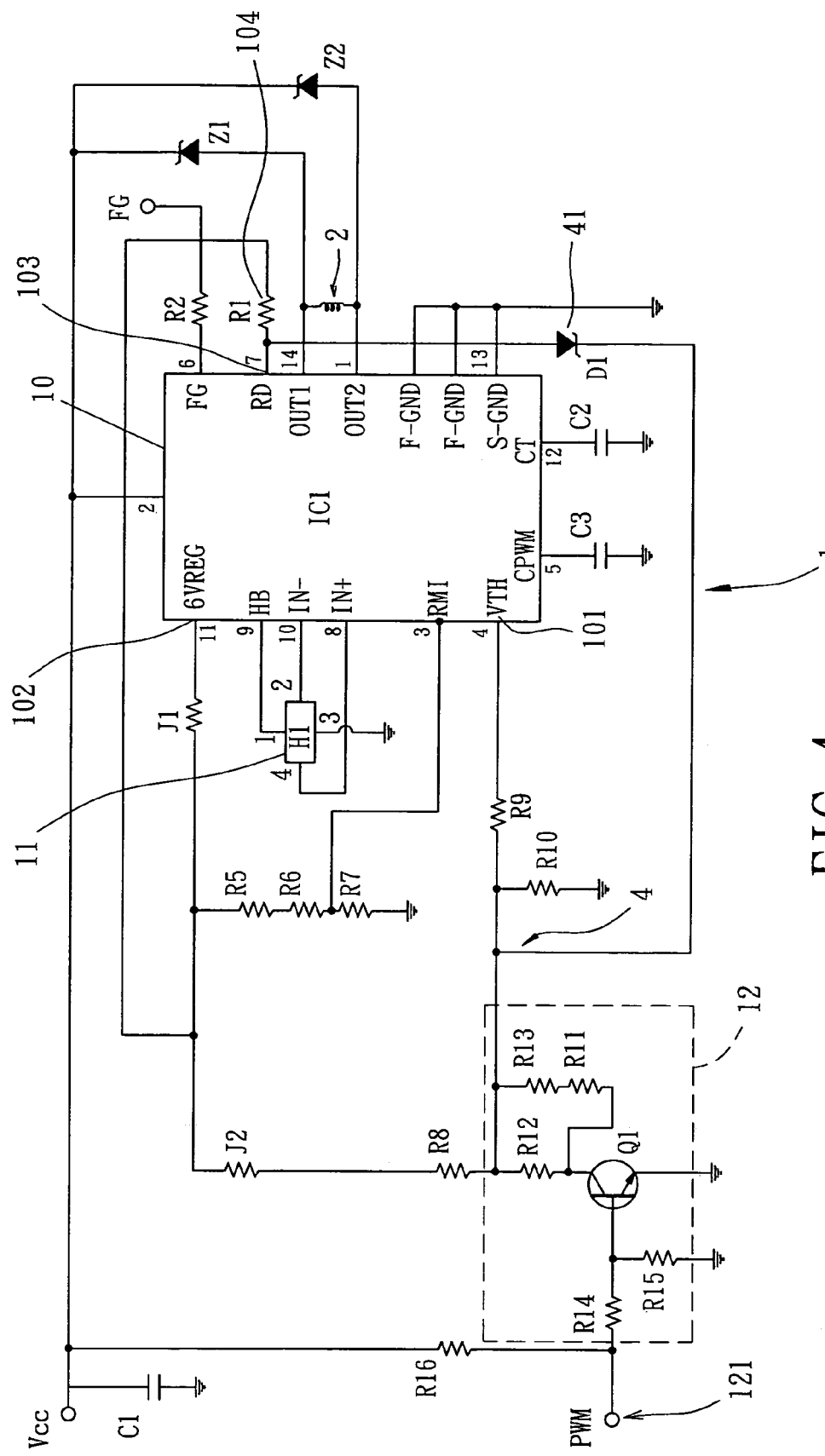
FIG. 4 is a schematic circuitry diagram of the brushless dc motor having the motor-locked protective circuit in accordance with a second embodiment of the present invention.

Turning now to FIG. 4, a schematic circuitry diagram of the brushless dc motor having the motor-locked protective circuit in accordance with a second embodiment of the present invention is illustrated. In the second embodiment, the motor drive circuit 1 includes a PWM drive IC member 10, a Hall IC member 11, a PWM converter circuit 12 and a RD signal line 4. In comparison with the first embodiment, the capacitor 3' of the first embodiment is omitted so as to simplify the entire structure. Once the motor is jammed (locked) or failed, the third pin 103 of the PWM drive IC member 10 can output a logical high-voltage signal of the RD signal across the RD signal line 4. Subsequently, the RD signal line 4 can immediately build a predetermined voltage between the first pin 101 of the PWM drive IC member 10 and the PWM converter circuit 12. Consequently, the PWM drive IC member 10 can automatically change to the low-speed mode from the high-speed mode, or maintain itself in the low-speed mode.

As has been discussed above, the RD signal line 4 electrically connects between the first pin 101 of the PWM drive IC member 10 and the PWM converter circuit 12, and alternatively provides the logical low-voltage or high-voltage signal thereto. In operation, the RD signal line 4 of the motor drive circuit 1 can perform a function of providing a high voltage on the first pin 101 of the PWM drive IC member 10 so as to avoid heat damage while the motor is jammed. Advantageously, the PWM drive IC member 10 of the jammed motor can limit itself to the low-speed mode or the like.

On the other hand, the capacitor 3' electrically connects in parallel between the first pin 101 of the PWM drive IC member 10 and the PWM converter circuit 12, and provides the predetermined voltage thereto while the motor is started or restarted. In starting or restarting operation, the voltage of the capacitor 3' can also perform a function of providing a high voltage on the first pin 101 of the PWM drive IC member 10 so as to avoid unexpectedly entering the high-speed mode. Advantageously, the PWM drive IC member 10 can ensure itself not to be operated in the high-speed mode while starting or restarting the motor.

Although the invention has been described in detail with reference to its presently preferred embodiment, it will be understood by one of ordinary skill in the art that various modifications can be made without departing from the spirit and the scope of the invention, as set forth in the appended claims.

What is claimed is:

1. A motor drive circuit for a brushless dc motor, comprising:
   a PWM drive IC member electrically connected with a motor coil, the PWM drive IC member being capable of controlling a speed of the motor;

a PWM converter circuit electrically connected with the PWM drive IC member for inputting a PWM signal; and a Rotational Detection (RD) signal line connected between the PWM drive IC member and the PWM converter circuit, said RD signal line further connected with a RD signal source;

wherein when the motor is operated, said RD signal line supplies a RD signal between the PWM drive IC member and the PWM converter circuit; and wherein when the motor is jammed, said RD signal line supplies a RD signal to build a predetermined voltage between the PWM drive IC member and the PWM converter circuit so as to maintain the PWM drive IC member to be operated in a low-speed mode.

2. The motor drive circuit for the brushless dc motor as defined in claim 1, wherein the RD signal source is disposed on a pin of the PWM drive IC member.

3. The motor drive circuit for the brushless dc motor as defined in claim 2, wherein said RD signal line includes a Zener diode so that said RD signal line connects with the RD signal source via the Zener diode.

4. The motor drive circuit for the brushless dc motor as defined in claim 1, further including at least one capacitor connected in parallel between the PWM drive IC member and the PWM converter circuit, said capacitor further connected with a power source; when the motor is started, said capacitor can built a predetermined voltage to prevent the PWM drive IC member to enter a high-speed mode; said capacitor can control the PWM drive IC member to gradually speed up speeds of the motor from zero to a predetermined speed.

5. The motor drive circuit for the brushless dc motor as defined in claim 4, wherein the PWM drive IC member has a first pin and a second pin; said capacitor connects between the first pin and the second pin of the drive IC member.

6. The motor drive circuit for the brushless dc motor as defined in claim 4, wherein said capacitor is constructed from a plurality of capacitor units which are connected in parallel or series each other.

7. The motor drive circuit for the brushless dc motor as defined in claim 6, wherein a capacitance of said capacitor is adjusted according to the design choice so that the buffer period of the PWM motor drive circuit can be adjusted.

8. The motor drive circuit for the brushless dc motor as defined in claim 4, wherein the PWM drive IC member has a buffer period for speeding up the speed of the motor such that the speed of the motor can be gradually speeded up within the buffer period to reach the predetermined speed.

9. The motor drive circuit for the brushless dc motor as defined in claim 1, wherein the PWM drive IC member includes a first pin, a second pin and a third pin, the RD signal source is disposed on the third pin of the PWM drive IC member which connects with the second pin via a resistor so as to built the predetermined voltage on the first pin of the PWM drive IC member.

10. A brushless dc motor, comprising:
a motor coil adapted to generate a magnetic field for driving a motor rotor;
a PWM motor drive circuit including a PWM drive IC member electrically connected to the motor coil, the PWM motor drive circuit being capable of controlling a speed of the motor;

a PWM converter circuit electrically connected with the PWM drive IC member for inputting a PWM signal; and a Rotational Detection (RD) signal line connected between the PWM drive IC member and the PWM converter circuit, said RD signal line further connected with a RD signal source;

wherein when the motor is operated, said RD signal line supplies a RD signal between the PWM drive IC member and the PWM converter circuit; and wherein when the motor is jammed, said RD signal line supplies a RD signal to build a predetermined voltage between the PWM drive IC member and the PWM converter circuit so as to maintain the PWM drive IC member to be operated in a low-speed mode.

11. The brushless dc motor as defined in claim 10, wherein the RD signal source is disposed on a pin of the PWM drive IC member.

12. The brushless dc motor as defined in claim 11, wherein said RD signal line includes a Zener diode so that said RD signal line connects with the RD signal source via the Zener diode.

13. The brushless dc motor as defined in claim 12, wherein the PWM drive IC member includes a first pin, a second pin and a third pin, the RD signal source is disposed on the third pin of the PWM drive IC member which connects with the second pin via a resistor so as to built the predetermined voltage on the first pin of the PWM drive IC member.

14. The brushless dc motor as defined in claim 10, further including at least one capacitor connected in parallel between the PWM drive IC member and the PWM converter circuit, said capacitor further connected with a power source; when the motor is started, said capacitor can built a predetermined voltage to prevent the PWM drive IC member to enter a high-speed mode; said capacitor can control the PWM drive IC member to gradually speed up speeds of the motor from zero to a predetermined speed.

15. The brushless dc motor as defined in claim 14, wherein the PWM drive IC member has a first pin and a second pin; said capacitor connects between the first pin and the second pin of the drive IC member.

16. The brushless dc motor as defined in claim 14, wherein said capacitor is constructed from a plurality of capacitor units which are connected in parallel or series each other.

17. The brushless dc motor as defined in claim 14, wherein the PWM drive IC member has a buffer period for speeding up the speed of the motor such that the speed of the motor can be gradually speeded up within the buffer period to reach the predetermined speed.

18. The brushless dc motor as defined in claim 17, wherein a capacitance of said capacitor is adjusted according to the design choice so that the buffer period of the PWM motor drive circuit can be adjusted.

* * * * *